June 4, 1957

R. A. BOSS 2,794,332

HEAT EXCHANGE METHOD AND APPARATUS

Filed Nov. 9, 1955

INVENTOR.
RALPH A. BOSS
BY
Wheeler, Wheeler & Wheeler
ATTORNEYS

INVENTOR.
RALPH A. BOSS
BY
Wheeler, Wheeler & Wheeler
ATTORNEYS

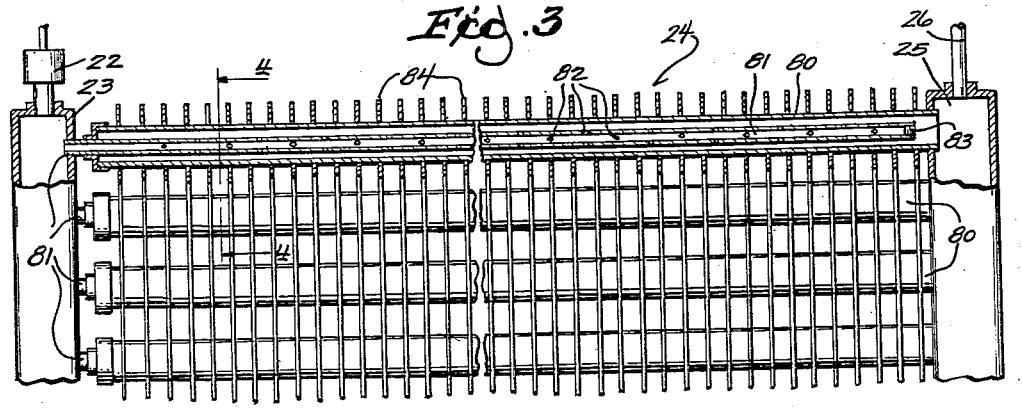
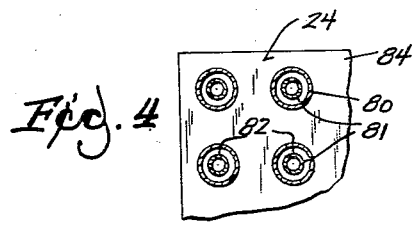
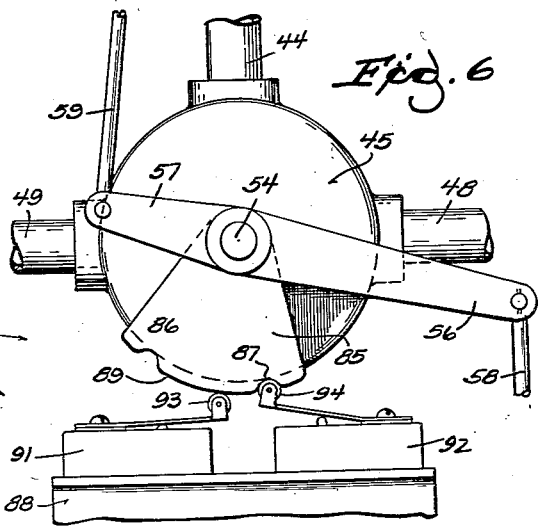
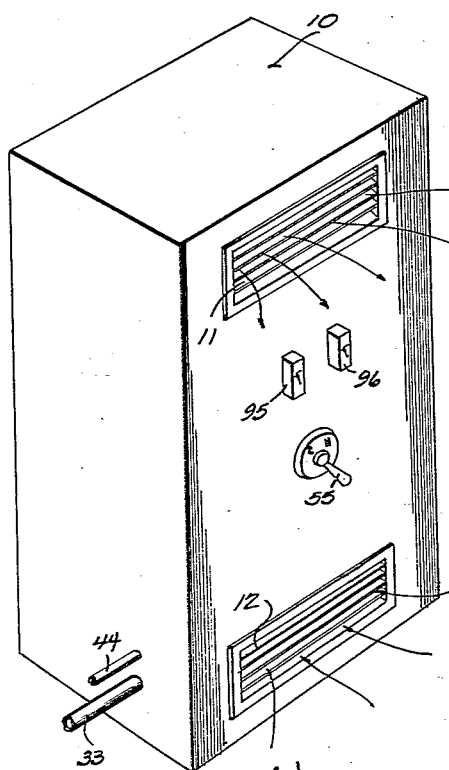
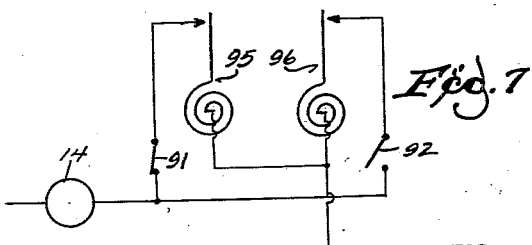

United States Patent Office 2,794,332
Patented June 4, 1957

2,794,332

HEAT EXCHANGE METHOD AND APPARATUS

Ralph A. Boss, Babson Park, Fla.

Application November 9, 1955, Serial No. 545,894

9 Claims. (Cl. 62—129)

This invention relates to a heat exchange method and apparatus.

The heat exchange method and apparatus of the present invention embodies in a single unit both heating and cooling means, the source of heat and cold being water or other abundant primary heat exchange fluid.

In the device of my invention a refrigerating system, which is for the most part conventional, has separate evaporator and condenser coils which are disposed in separate tanks, and are alternatively submerged in the primary heat exchange fluid or exposed to a secondary heat exchange fluid, usually atmospheric air. In the cooling cycle the evaporator coil is exposed to air and the condenser is immersed in water and will give off heat thereto, the evaporator cooling the air which is passed thereover. In the heating cycle the evaporator is immersed in water and will take heat from the water, the air being passed over the condenser which is exposed to release heat thereto.

In the apparatus and method of the present invention, the water itself is used as a baffle to direct the air to the heat exchange surface which is proper for the selected cycle. Additional baffle means may be provided to co-operate with the rising and falling level of water in the respective tanks to direct the air through the proper heat exchange surface. When the tank containing the evaporator coil is filled with water, flow of air therethrough is blocked and the air is accordingly directed through the empty tank containing the condenser. When the condenser tank is filled with water, the water will block passage of air therethrough, the air being required to pass through the empty tank containing the evaporator.

My novel method and apparatus in which the respective evaporator and condenser coils are alternatively submerged in water and exposed to air provides novel means for cleaning the coils. At each change of season the coil previously immersed in water is exposed to the flow of air. The coating of mineral deposits, sludge, etc., accumulated on the surface of the coil will be scrubbed and dislodged by the air blast, thus tending to clean the coils without further attention.

The apparatus of the present invention advantageously lacks the high pressure valves which characterize the primary heat exchange fluid circuits of devices heretofore available. The water flow circuit in the device of the present invention is simply controlled by flush valves of the inexpensive and easily repairable type.

The tanks are open to the atmosphere and accordingly the evaporator and condenser are under low external pressure even when submerged. Accordingly, these heat exchange elements may be relatively inexpensively fabricated, with corresponding reduction in maintenance cost as composed with prior art heavy-duty chillers and condensers which are subjected to relatively high water pressure.

In this connection, I provide a novel refrigerator evaporator coil construction which improves the efficiency of heat exchange in a novel coaxial chamber structure in which a perforated high pressure innermost tube directs saturated refrigerant vapor against the inner wall of an outermost chamber to maintain the outermost chamber in constant contact with the saturated vapor. Thus the entire surface of the outer chamber functions at peak efficiency and the pressure drop from inner to outer chamber is uniform throughout the length of the chamber.

Other objects and advantages of the invention will be more apparent upon examination of the following disclosure.

In the drawings:

Fig. 3 is an enlarged fragmentary cross sectional view taken through the evaporator of a device embodying my invention.

Fig. 4 is an enlarged fragmentary cross sectional view taken along the line 4—4 of Fig. 3.

Fig. 5 is an external perspective view of a device embodying the invention.

Fig. 6 is an enlarged elevation of the control valve, associated parts being shown fragmentarily.

Fig. 7 is an electric circuit diagram of the connections from the thermostats active in the heating and cooling cycles to the compressor motor.

Figure 1:
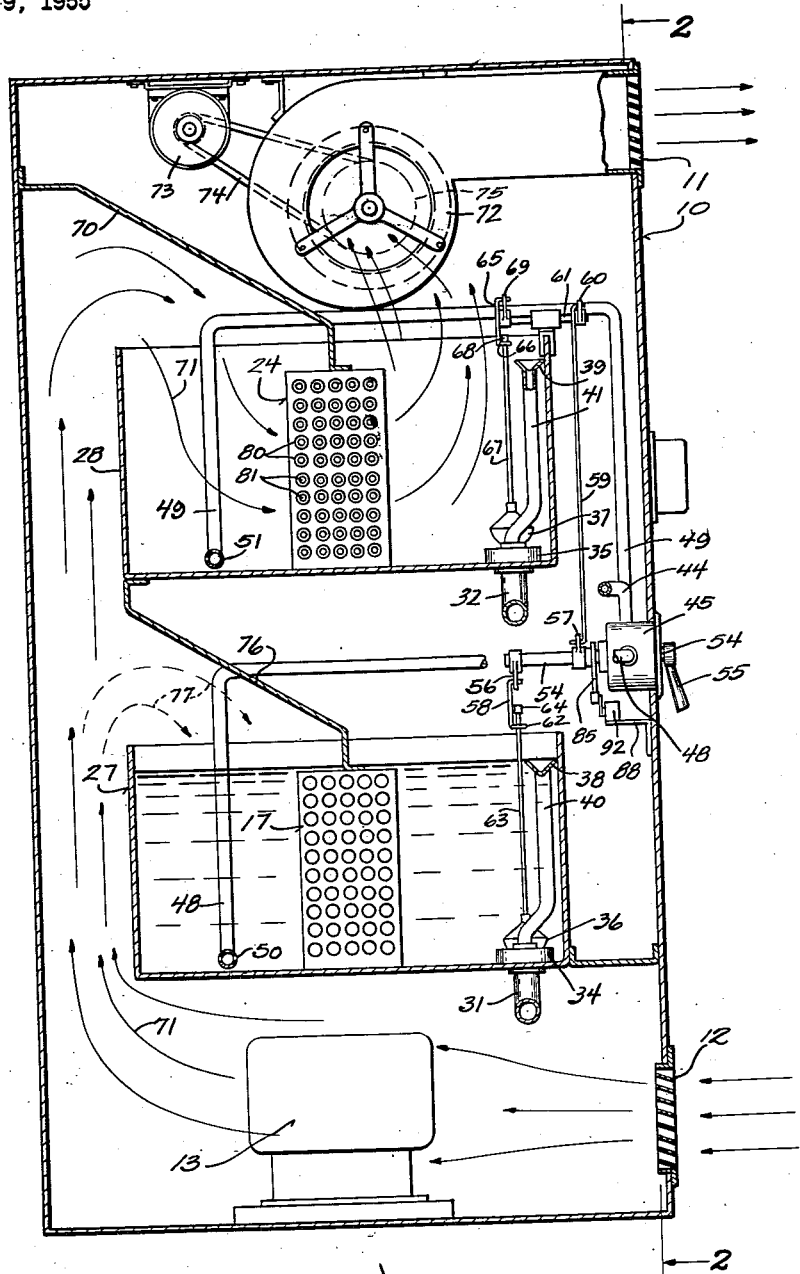
Fig. 1 is a vertical cross section taken through an embodiment of the invention, and along the line 1—1 of Fig. 2.

All of the apparatus embodying the invention may conveniently be housed in the cabinet 10 which may be small enough to service a single room or large enough to service an entire building. If a central unit the outlet register 11 is connected to ducts leading to various rooms, the inlet register 12 being connected with the return ducts therefrom. If for a single room, the respective registers 11 and 12 communicate directly with the ambient air in the room. Inlet duct 12 may also be connected with outside air if desired.

Within the cabinet I provide a refrigerating system including a compressor 13 powered by a motor 14 (Fig. 7). The position of the compressor is not critical as in other embodiments of the invention it may be disposed at a remote position outside of the cabinet. However, when inside the cabinet, compressor 13 is desirably positioned in the path of air flowing through inlet register 12.

The compressor is connected by hot gas line 15 which supplies compressed hot refrigerant gas to the hot gas header 16 of the condenser 17. The hot gas is condensed in the condenser 17 in the conventional manner, the condensed liquid being collected in the header 18. From the header 18 the condenser refrigerant flows through line 21 to the expansion valve 22 into the liquid header 23 of the evaporator 24. The evaporator desirably has novel coils fabricated as hereinafter described.

The refrigerant evaporated in evaporator 24 returns through suction header 25 and suction line 26 to the compressor 13. Except for the novel evaporator coils aforesaid, the refrigerating circuit is conventional.

The condenser and evaporator coils of the refrigerating system are disposed respectively in tanks 27, 28, which, in the embodiment shown, are vertically spaced and are open to the atmosphere. The particular disposition of the tanks is not critical and I have also constructed a heat exchanger in which the respective tanks are at the same horizontal level. However, for economy of floor space, I prefer the vertically oriented embodiment shown in the drawings.

The respective tanks 27, 28 are alternatively filled with and emptied of a primary heat exchange fluid which in most instances will be abundant water. In many geographical areas water is available at a temperature which does not vary substantially with changes in the season. Thus in wintertime the water may be a source of heat in the heating cycle of my device and in the summertime such water is a source of cold in the cooling cycle of my device.

The respective tanks are provided with drain pipes 31, 32 which have a common outlet 33. The respective tanks 27, 28 may be drained from bottom drain openings 34, 35 which may be selectively closed by conventional flush tank ball valves 36, 37. The drain pipes 31, 32 are also connected through drain pipes 40, 41 to drain weirs 38, 39. The respective weirs 38, 39 are disposed near the tops of their respective tanks 27, 28 and above the level of the heat exchange surfaces of the condenser 17 and evaporator 24.

Figure 2:
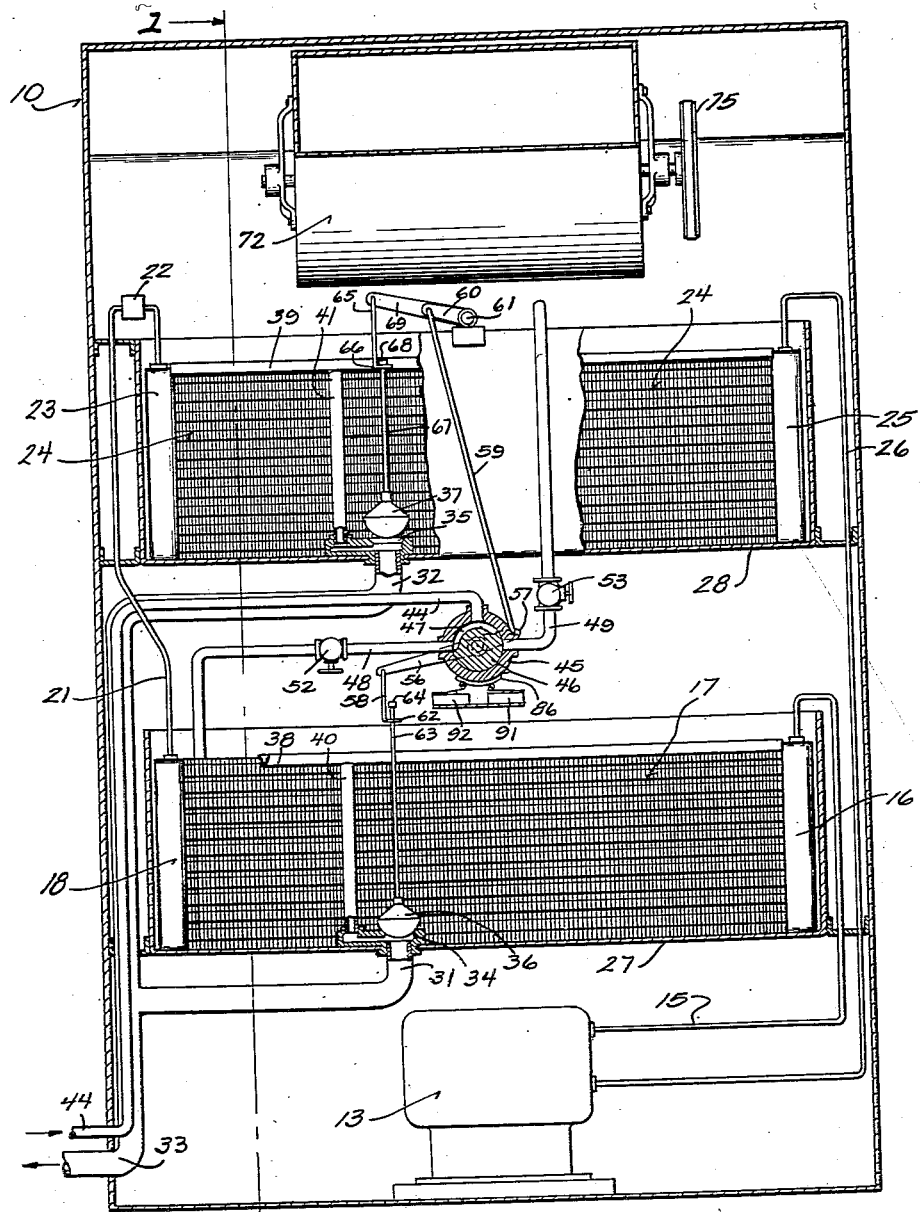
Fig. 2 is a vertical cross section taken along the line 2—2 of Fig. 1.

The respective tanks 27, 28 are supplied with water, usually from the city water system or a well, through inlet pipe 44 and valve 45. As best shown in Fig. 2 valve 45 has a plug rotor 46 with an arcuate port 47 which selectively connects inlet pipe 44 either to pipe 48 which supplies water to tank 27 or to pipe 49 which supplies water to tank 28. The respective inlet pipes 48, 49 open near the bottoms of the respective tanks through longitudinally extending perforated header pipes 50, 51. The pipes 48, 49 are provided with balancing valves 52, 53 which may be adjusted for the desired rate of flow of water therethrough.

Although the rotation of the shaft could be motorized if desired, I desirably provide the control shaft 54 of valve plug 46 with a control handle 55 which is exposed at the front of cabinet 10 for manual manipulation. The shaft 54 extends rearwardly from the housing of valve 45 and is provided with crank arms 56, 57 to which actuating linkages 58, 59 are respectively connected. Linkage 58 has an apertured end 62 in sliding connection with the stem 63 of flush valve 36. Stem 63 is provided with an end stop 64 which engages the end 62 of link 58 in the valve opening movement of the link. The sliding connection aforesaid provides a lost motion connection between the stem 63 and link 58.

Link 59 is connected to one crank arm 60 of a bell crank shaft 61 having another bell crank arm 69 connected to the link 65 having an apertured end 66 through which the stem 67 of ball valve 37 extends. Stem 67 has an end stop 68 providing a lost motion connection with the link 65.

In the foregoing structure the action of the ball valves 36, 37 is interlocked with the action of the valve plug 46. When the control handle 55 is moved to the cooling cycle position in which it is illustrated in the drawings, the shaft 54 will be rotated in a counterclockwise direction to its position shown in Fig. 2 in which ball valve 36 closes the drain outlet 34 at the bottom of tank 27, and ball valve 37 is lifted from drain outlet 35 in tank 28. Concurrently water inlet pipe 44 is connected to pipe 48 and water pipe 49 is disconnected from the water inlet pipe 44. In this manner water is supplied to tank 27 and drained from tank 28.

Accordingly, in the cooling cycle of the device the coils of condenser 17 are immersed in water which constantly flows over the heat exchange surfaces thereof. Water heated by contact with the condenser coils rises to the top of the tank and overflows into the weir 38 and is discharged to waste through drain pipes 40 and 31. Accordingly, the heat of compression of the refrigerant is extracted therefrom and removed from the system.

The evaporator 24 is concurrently exposed to the flow of ambient air which is directed as shown by the arrows 71 through the coils of the evaporator 24 to be cooled thereby. The cooled air flows through the eye of the centrifugal blower fan 72 and into the room or duct system through the outlet register 11. The blower fan may be powered by separate motor 73 connected by means of the belt 74 to the pulley 75 of the blower fan 72.

The space between the top of evaporator 24 and the cabinet side wall is spanned by baffle 70. The space between the top of condenser 17 and bottom of tank 28 is spanned by baffle 76. The connections between the respective baffles 76, 70 and the condenser 17 and evaporator 24 is at or below the level of the respective weir troughs 38, 39. Accordingly, when tank 27 is full of water, as shown in Fig. 1, the ambient air is blocked by the water in tank 27 and the baffle 76 from passing through the immersed coils of the condenser or from otherwise bypassing its flow path through the exposed coils of the evaporator 24, as shown by the arrows 71.

In the heating cycle control lever 55 is moved clockwise. Water will then fill tank 28 and will drain from tank 27. The water in tank 28 will seal off flow of air through the tank 28, all the air being required to flow through the empty tank 27 and through the exposed coils of condenser 17, as indicated by the alternate air flow arrows 77. In the heating cycle the water in tank 28 gives up heat to the refrigerant in evaporator 24, the chilled water being discharged to waste by overflowing the weir 39. The ambient air picks up heat by flowing over the coils of condenser 17, as aforesaid.

In this manner the baffles 70, 76 and the rising and falling level of water in the tanks cooperate in channeling the ambient air to flow through the proper heat exchange surfaces of the respective condenser and evaporator depending on the cycle for which the control lever 55 is set.

During the changeover period between cycles, the water level in both tanks 27, 28 will drop and air will flow through both the condenser and evaporator. The hot and cold air emanating from the condenser and evaporator will combine in the fan housing for thermal cancellation. The system will be substantially in thermal balance and will neither heat nor cool.

My device in which the primary heat exchange fluid is discharged directly to waste prevents overload of the compressor during changeover from one cycle to another. This is a marked advantage over prior art devices known to me in which cold water is pumped over the coils of the condenser and hot water is pumped over the coils of the evaporator during changeover, thereby greatly increasing the rate of heat exchange during this period and making it necessary to provide limiting controls lest the compressor be overloaded. In my device the spent water is discharged directly to waste and does not affect the load on the compressor.

Periodic exposure of the condenser and evaporator coil surfaces to the blast of abient air will scrub from the surface thereof deposits of minerals, sludge, etc., which may have accumulated during the submersion of the coils in water. In this manner, the need for cleaning the coils of such foreign matter is greatly reduced. Moreover, the tanks are desirably mounted so that they can be lowered from housed relationship with the coils when more extensive cleaning and/or maintenance of the heat exchange surfaces is required.

Unlike prior art devices known to me, the condenser and evaporator coils of my apparatus are subject to relatively low external pressures. This is because the tanks 27, 28 are open to the atmosphere and the pressure of the water on the heat exchange coils is a minimum. Accordingly, the evaporator and condenser structure may be lightweight and relatively inexpensive, thereby reducing the cost and weight of the device. Maintenance problems are correspondingly simplified. Moreover, the high water pressure valves standard in the prior art are superseded by the simple low pressure flush tank type valves herein disclosed.

As best shown in Fig. 3, I desirably employ a novel evaporator coil construction which is highly efficient and requires a relatively small area of heat exchange surface for a given cooling effect. Of course, any conventional evaporator construction could be used in the system of the invention. However, because of the unique advantages of the specific evaporator structure disclosed, I prefer the disclosed structure for use in my system.

The evaporator coil comprises multiple outer chambers or tubes 80 which are open to the suction header 25. Within each tube 80 I provide a coaxial tube 81 of smaller diameter which is open to the liquid refrigerant header 23. The connections from tubes 81 to header 23 are such that each tube is under substantial equal pressure.

The inner coaxial tubes 81 are provided with series of radial ports or orifices 82 distributed uniformly along the entire length of each tube 81. The ends of the tubes may be plugged at 83. Accordingly, the saturated refrigerant vapor which enters an inner tube 81 under pressure is jetted radially against the inner wall of an outer tube 80 to keep the tube wall "wet." Accordingly, the entire length of each tube 80 is directly and intimately exposed to the saturated vapor and superior heat exchange is effected. The primary heat exchange liquid flows directly over the outer wall of tube 80 and over the surface of heat exhange fins 84 to effect maximum heat exchange with the refrigerant. Moreover, in the disclosed structure, there is a uniform drop in refrigerant pressure between tube 81 and tube 80 throughout the length of the coaxial tubes. This is unlike prior art devices in which the refrigerant is simply admitted to the coil and greater cooling effect is manifested at the end of the tube which is proximate the header than at the other end of the tube which is remote from the header. My uniformly distributed vapor contact makes all areas of the evaporator coils function at peak efficiency.

When the device functions in its cooling cycle the evaporator also functions to condense water from humid air flowing thereover to dehumidify such air. The condensate flows to waste through drain 32.

In Figs. 6 and 7 I disclose one embodiment of my control circuit and actuating mechanism. The shaft 54 is provided with a cam 85 having an arcuate surface 89 with spaced notches 86, 87. On a bracket 88 beneath the control valve 45 I mount two control switches 91, 92 having actuator arms and cam follower rollers 93, 94 respectively. The respective switches 91, 92 are in series circuit respectively with dual thermostats 95, 96. One thermostat is set for controlling room temperature in the heating cycle of the device and the other thermostat is set for controlling the temperature of the room in the cooling cycle of the machine. As handle 55 is turned to change the valve connections aforesaid, cam 85 will release one switch and close the other switch to concurrently place in circuit the proper thermostat for the particular cycle for which the control lever is set.

Any conventional connection of the control circuit to the compressor motor 14 may be employed. The fan motor may also be interconnected in the thermostat circuit. I may prefer to maintain the fan motor in constant operation to insure constant re-circulation of air, only the motor 14 being controlled by the thermostats, this being the embodiment illustrated in the drawing.

I have illustrated in the drawing a manual control handle 55 although in the broad aspects of the invention the control valve and associated parts can be motorized and respond to temperature changes affecting the action of the thermostats 95, 96.

The disclosed construction in which the exposed tank 28 is filled with water during the heating cycle provides for humidifying the air which flows over condenser coils 17. The dry air within the cabinet continually evaporates moisture from tank 28 for entrainment in the air flow through the condenser coils. The rate of evaporation is relatively high when the relative humidity of the ambient air falls below about forty percent.

During the cooling cycle the moisture laden summer air flowing over the evaporator coils 24 in tank 28 will be dehumidified by the condensation of its moisture content on the coils 24.

Accordingly, the device of the present invention automatically dehumidifies the air in the summertime and humidifies the air in wintertime.

I claim:
1. A heat exchanger comprising the combination with a refrigerating system including evaporator and condenser heat exchange surfaces, of separate tanks in which said surfaces are disposed, means for selectively filling and emptying said tanks with a first heat exchange fluid and control means therefor whereby when one tank is full the other is empty, and means for directing a second heat exchange fluid across the heat exchange surface in the empty tank for heat exchange therewith.

2. A heat exchanger comprising the combination with a refrigerating system including evaporator and condenser heat exchange surfaces, of separate tanks in which said surfaces are disposed, means for selectively filling and emptying said tanks with a first heat exchange fluid and control means therefor whereby when one tank is full the other is empty, and means for directing a second heat exchange fluid across the heat exchange surface in the empty tank for heat exchange therewith, in further combination with baffle means for the said second heat exchange fluid, said baffle means comprising baffle elements extending into said tanks to cooperate with the first heat exchange fluid in shutting off flow of said second heat exchange fluid over the heat exchange surface in whichever tank is full of said first heat exchange fluid.

3. The device of claim 2 in which said second heat exchange fluid will flow over both heat exchange surfaces in both tanks when neither tank is full of said first heat exchange fluid whereby the system will be in substantial thermal balance during changeover periods between heating and cooling cycles thereof.

4. A heat exchanger comprising the combination with a refrigerating system including evaporator and condenser heat exchange surfaces, of separate tanks in which said surfaces are disposed, means for selectively filling and emptying said tanks with a first heat exchange fluid and control means therefor whereby when one tank is full the other is empty, and means for directing a second heat exchange fluid across the heat exchange surface in the empty tank for heat exchange therewith, said evaporator comprising coaxial walled chambers, the innermost chamber having outlet orifices distributed substantially throughout its length, a suction line connected to the outermost chamber and a refrigerant pressure line connected to the innermost chamber, said pressure line supplying substantially saturated refrigerant vapor to said innermost chamber for discharge through said orifices against the wall of the outermost chamber.

5. A heat exchanger device adapted for selective use either as a heater or a cooler and comprising a refrigerating system including evaporator and condenser heat exchange surfaces open to the atmosphere, means for selectively flowing a primary heat exchange fluid open to the atmosphere over the evaporator heat exchange surfaces as a source of heat in the heating cycle of the device and over the condenser heat exchange surfaces to extract heat in the cooling cycle of the device, and means for selectively flowing a secondary heat exchange fluid open to the atmosphere over the condenser heat exchange surface in said heating cycle to pick up heat therefrom and over the evaporator heat exchange surface in said cooling cycle to give up heat thereto.

6. A heat exchanger comprising the combination with a refrigerating system including evaporator and condenser heat exchange surfaces, and means for selectively and alternatively flowing water and air as a heat exchange fluid across said surfaces, in combination with separate tanks open to the atmosphere in which said condenser and evaporator surfaces are respectively disposed, said means comprising water inlet and outlet connections to each tank and means directing air to whichever tank is empty.

7. The device of claim 6 in which said water inlet and outlet connections respectively comprise drain outlets in each tank and drain valves therefor, overflow pipes for each tank, means for alternatively supplying water to said inlet connections and concurrently closing the drain valve of the drain of the tank to which the inlet valve is open and opening the drain valve of the tank to which the inlet valve is closed.

8. A heat exchange method for selectively heating and cooling a secondary heat exchange fluid open to the atmosphere and comprising the steps of selectively flowing a primary heat exchange fluid open to the atmosphere over the evaporator heat exchange surfaces of a refrigerating system as a source of heat in a heating cycle and over the condenser heat exchange surfaces of said refrigerating system to extract heat in a cooling cycle, and selectively flowing said secondary heat exchange fluid open to the atmosphere over the condenser heat exchange surfaces of said refrigerating system in said heating cycle to pick up heat therefrom and over the evaporator heat exchange surfaces in said cooling cycle to give up heat thereto.

9. A heat exchanger comprising the combination with a refrigerating system including evaporator and condenser heat exchange surfaces, of separate tanks open to the atmosphere in which said surfaces are disposed, means for selectively filling and emptying said tanks with a first heat exchange fluid and control means therefor whereby when one tank is full the other is empty, and means for directing a second heat exchange fluid across the heat exchange surface in the empty tank for heat exchange therewith.

References Cited in the file of this patent

UNITED STATES PATENTS

| | | |
|---|---|---|
| 2,138,187 | McElgin | Nov. 29, 1938 |
| 2,229,032 | Ashley | Jan. 21, 1941 |
| 2,421,293 | Shawhan | May 27, 1947 |
| 2,432,316 | Kemler | Dec. 9, 1947 |
| 2,441,270 | Koesel | May 11, 1948 |